United States Patent [19]

Pack et al.

[11] Patent Number: 5,299,019
[45] Date of Patent: Mar. 29, 1994

[54] IMAGE SIGNAL BAND COMPRESSING SYSTEM FOR DIGITAL VIDEO TAPE RECORDER

[75] Inventors: Seung K. Pack; Tae Y. Chung, both of Seoul, Rep. of Korea

[73] Assignee: Samsung Electronics Co., Ltd., Rep. of Korea

[21] Appl. No.: 992,692

[22] Filed: Dec. 18, 1992

[30] Foreign Application Priority Data

Feb. 28, 1992 [KR] Rep. of Korea .................. 92-3168

[51] Int. Cl.$^5$ ...................... H04N 1/415; H04N 1/46
[52] U.S. Cl. .............................. 358/261.3; 358/261.2; 358/432; 358/433; 358/530; 358/539; 382/50; 382/56
[58] Field of Search ............... 358/261.1, 261.2, 261.3, 358/261.4, 262.1, 426, 432, 433, 530, 539; 382/50, 56

[56] References Cited

U.S. PATENT DOCUMENTS

| | | | |
|---|---|---|---|
| 5,063,608 | 11/1991 | Siegel | 382/50 |
| 5,121,216 | 6/1992 | Chen et al. | 358/261.3 |
| 5,136,371 | 8/1992 | Savatier et al. | 358/261.3 |
| 5,148,271 | 9/1992 | Kato et al. | 382/56 |
| 5,212,742 | 5/1993 | Normile et al. | 382/56 |
| 5,241,395 | 8/1993 | Chen | 358/261.3 |

*Primary Examiner*—Edward L. Coles, Sr.
*Assistant Examiner*—Kimberly A. Williams
*Attorney, Agent, or Firm*—Weingram & Zall

[57] ABSTRACT

The image signal band compressing method employs a three-dimensional motion compensating technique, an intraframe and an interframe processes which are alternatively executed. The transfer rate of the intraframe to the interframe is set to 4:1 in a unit of fixed length. The intraframe process is defined such that the present frame image data is compressed in a variable length compressing manner by way of two-dimensional discrete coding transform. The interframe process is defined such that motion data is estimated by comparing the present frame and the preceding frame, the present frame is expected on the basis of the motion data and the difference data between the motion compensated image data and the present frame data.

1 Claim, 5 Drawing Sheets

DIRECTION FOR ELIMINATING OR STUFFING COEFFICIENT
IN FIXED LENGTH UNIT

IMAGE SIGNAL BAND COMPRESSING SYSTEM FOR DIGITAL VIDEO TAPE RECORDER

BACKGROUND OF THE INVENTION

1. Field of the Invention

The present invention relates to a video image signal band compressing system for a digital video tape recorder (D-VTR) of a high picture quality.

More particularly, the present invention relates to a video image signal band compressing system which digitally converts a component image signal as a signal source and compresses the digitally converted signal in a unit of fixed length depending upon a human visual property and a statistical nature and frequency distribution of the image to execute a additional high speed playback of the D-VTR.

2. Description of Related Art

With a recently advanced technique in the fields of a computer, a semiconductor device and a digital signal processing system, a storage and transfer of a digitized signal is also developed remarkably.

When such an image signal is stored or transferred in digital, a massive amount of the image signal must be processed as compared with an analog data, so compression of the image data is needed to effectively utilize a capacity of a storage medium and a data transferring channel. Accordingly, it requires that the image data must be compressed in a given amount while completely representing original information contents. Further, the image data compressed has a reliable characteristic to an error occurred in a storage medium and a hardware for compressing in image data must be easily embodied.

According to a typical image signal band compressing system, the image signal is divided into several blocks and the blocked image signal is subjected to a variable length coding achieved by way of a transform coding technique, for example, a discrete cosine transformation (DCT). In the image signal coding using such a DCT technique, since energy of the image signal is condensated on a low frequency portion, the original information can be reliably represented using a small quantity of data by coding the low frequency region of the image signal.

According to the aforementioned variable length coding technique, a codeword of given data is variably assigned with reference to the probability density of the image data and the codeword having variable length is transferred. This technique is suitable to apply when the image data to be processed are not uniformly distributed.

Therefore, the variable length coding technique assisted by the DCT coding can be effectively employed to reliably express the ununiformely distributed image data.

According to the technique denoted above, however, only local property of the image is considered in the image data coding. When the complex image signal having a fluctuating region and a flattening region of the image data is subjected to the previously noted coding in the D-VTR which compresses the image signal into a target amount of data in unit of a fixed length, and transfers and stores the compressed image signal, surplus data produced in processing the flattening region are not sufficiently utilized, so that serious deterioration of the picture quality in a portion adjacent to the flattening region and the fluctuating region is occurred undesirably.

In the variable length coding of the image data, it is required to a constant amount of data per a unit time duration in order to store or transfer the data coded. Accordingly, a buffer is needed to temporarily store the coded data and a step size of quantization must be controlled by a buffer pre-control or buffer post-control technique to adjust the amount of the data produced.

While such a buffer pre-control technique has an advantage that an error in the storage medium is propagated in a unit of fixed data length, it is difficult to adjust the amount of the data produced in a unit of fixed length to the desired amount of data.

On the contrary, according to the buffer post-control technique, such a step size in the quantization is decided in accordance with the repleted degree of a buffer under periodic confirmation of the status of the buffer. Accordingly, the amount of the data to be stored or transferred is coincided with the desired amount of data. Plus it has a block effect occurred due to a quantization error when the fluctuating region adjoins the linear region.

SUMMARY OF THE INVENTION

Accordingly, an object of the present invention is to provide an image signal band compressing system which overcomes the above-mentioned problems and effects an image signal band compression in accordance with a statistical property and frequency distribution of the image signal, thereby improving the picture quality in a digital video tape recorder.

To achieve the above object, according to an aspect of the present invention, there is an image signal band compressing system comprising: a mode switching means for processing image data in a unit of block or macro block, the image data being produced from component image signals converted in a ratio of 4:2:0, and the component image signals having a brightness signal Y and color signals Cr and Cb set in a ratio of 4:2:2 in correspondence to an intraframe mode or an interframe mode;

a scrambling means for supplying surplus data of a fluctuating region of the image input and resorting the image input without using additional data, the picture quality-deteriorated portion of the image input being condensated at edges of the image;

a discrete cosign transform means for transforming and coding the output of the scrambling means by using discrete coding transform factors;

a human visual unit for processing the output of the discrete coding transform means in correspondence to sensitivity of the human visual system;

an activity calculating means for calculating an activity and an activity average of the output of the human visual unit in the intraframe process mode or interframe process mode;

a first quantization means for quantizing the output of the human visual unit in a unit of block or macro block, the quantized output having a step size determined by the activity and activity average corresponding to the intraframe or interframe processing mode;

a first adaptive scanning means for comparing the activities between two regions in four scanning areas of 4 pixels×4 lines in a block of 8 pixels×8 lines and executing any one of a horizontal scanning, a vertical scanning and a zigzag scanning;

a first variable length coding means for effecting a variable length coding of the output of the first adaptive scanning means and calculating a difference between the amount of data produced by accumulating the variable length coded data in a unit of fixed length and a target amount of data;

a buffer for temporarily storing the output of the first variable length coding means;

a second quantization means for quantizing the output of the human visual unit in block or macro block at a step size decided on the basis of the difference $\beta$ from the first variable length coding means and the activity and activity average from the activity calculating means.

a second adaptive scanning means for comparing the activities between two regions of four scanning areas in the output of the second quantization means and effecting any one of horizontal scanning, vertical scanning and a zigzag scanning;

a second variable length coding means for executing a variable length coding to the output of the second adaptive scanning means and calculating a difference between the amount of data produced by the variable length coding process and a target amount of data;

a comparator for selecting the output of the first variable length coding means when an absolute value $|\beta-\gamma|$ is equal to or less than the absolute value being obtained by subtracting the difference of the second variable length coding means from the difference of the first variable length coding means and, contrarily, selecting the output of the second variable length coding means when the absolute value is not zero; and, a factor removing and stuffing-bit appending means for removing factors of data exceeding the fixed length when an overflow is generated on the basis of the difference from the comparator and, contrarily, appending a stuffing bit when an underflow is generated.

The above and other features and advantages of the present invention will be apparent from the following description taken in conjunction with the accompanying drawings.

BRIEF DESCRIPTION OF THE DRAWINGS

FIG. 3 is views illustrating a data scrambling procedure according to the present invention wherein (a) denotes a brightness signal, (b) a red color difference signal, (c) a view showing the principle of the data scrambling of a blue color difference signal, and (d) a view showing the status of data rearranged in a unit of fixed data length;

DETAILED DESCRIPTION OF THE INVENTION

Thereinafter, the present invention will be described with reference to the drawings.

Figure 1A:
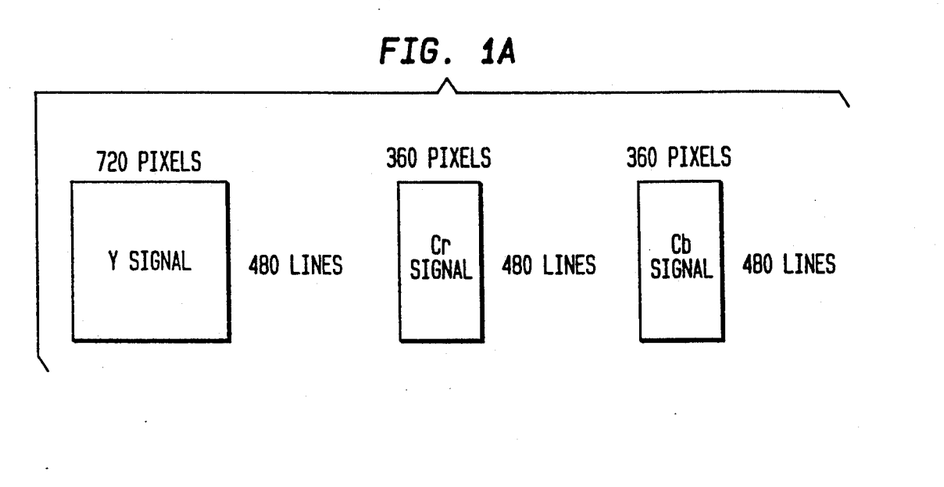
FIG. 1(a) is a view showing data format of 1-frame component image signal data just after transformed into digital data, (b) is a view showing a format of the data shown in FIG. 1(a) and just after passed through prefilters, and (c) is a view showing a structure of a macro block of the data.

FIG. 1 shows a data format of an input signal and a unit structure of signal processing according to the present invention.

Referring to FIG. 1, a brightness signal Y and color difference signals Cr and Cb in the component image signal are digitized by sampling frequencies of 13.5 MHz and 6.7 MHz such that the Y signal of 720 pel $\times$ 480 line per a frame, the Cr signal 360 pel $\times$ 480 line and the Cb signal 360 pel $\times$ 480 line are processed as effective data.

The effective image data of a frame are converted according to a line pre-sequence of a vertical sub-sampling to the color difference signals, that is, the Cr signal = 360 pel $\times$ 240 line and the Cb signal = 360 pel $\times$ 240 line, and thus converted image data is employed to a band compressing means which will be described later as an input signal.

Figure 2:
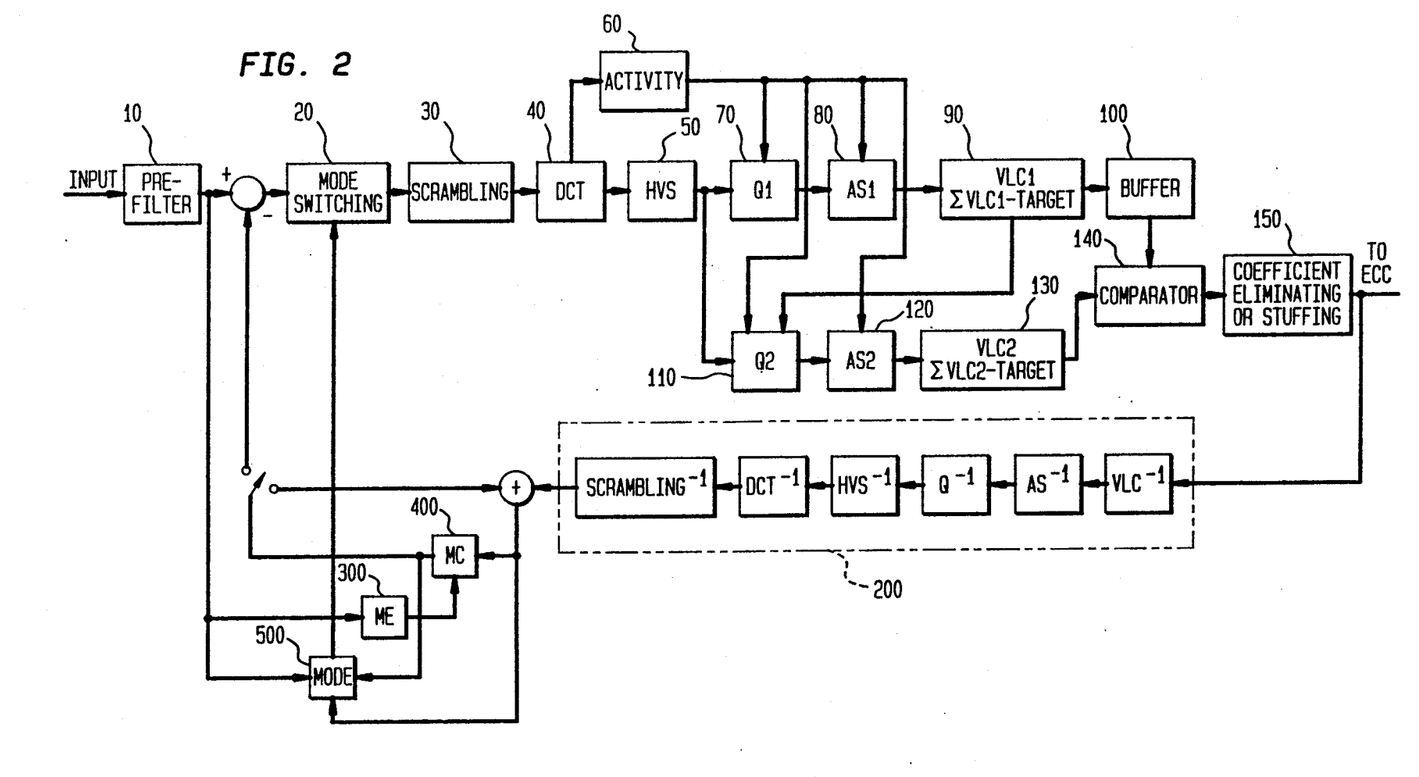
FIG. 2 is a block diagram of an image signal compressing system to which the present invention is applied.
Figure 3A:
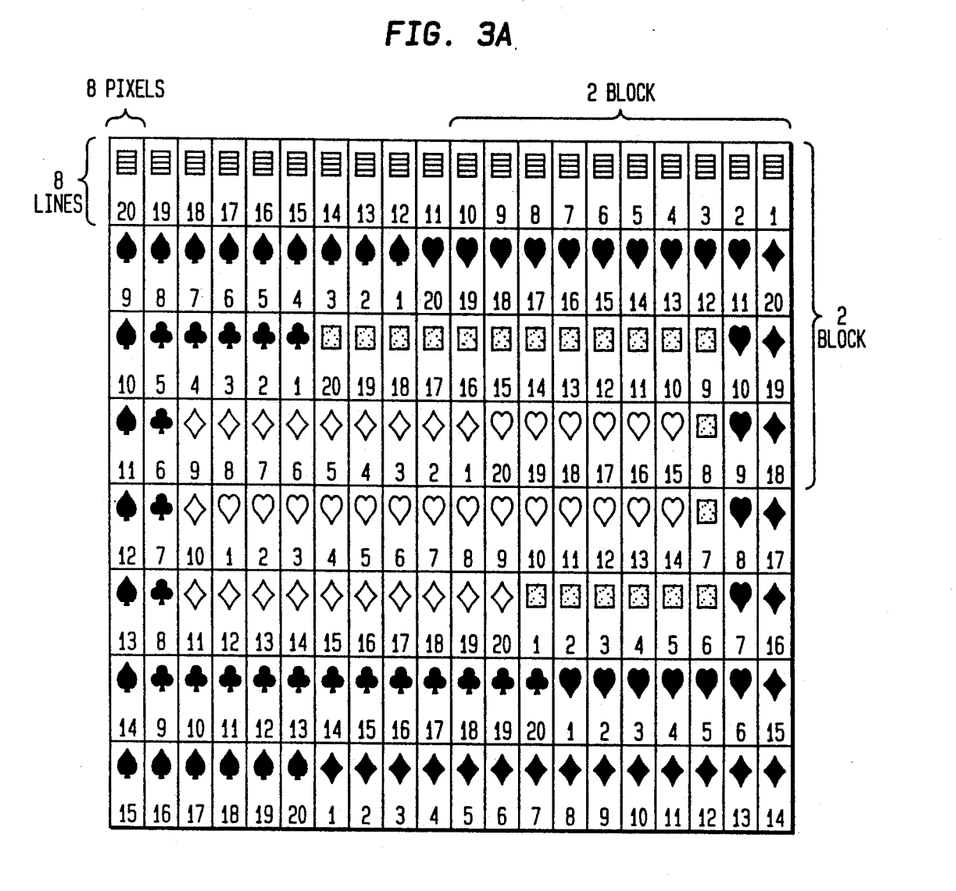
Figure 3B:
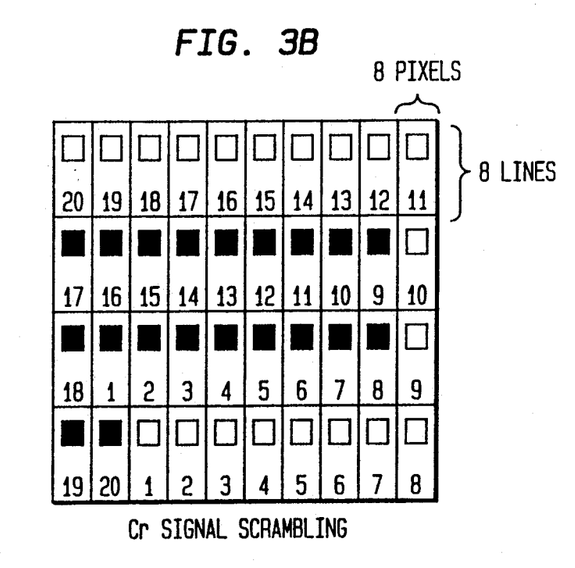
Figure 3C:
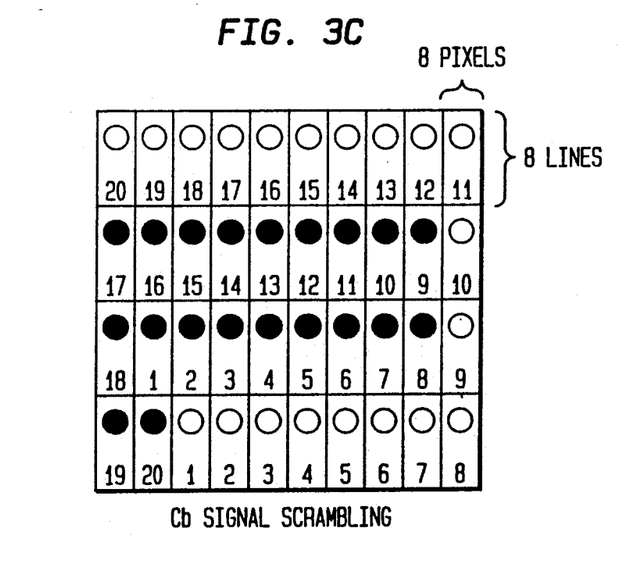
Figure 3D:
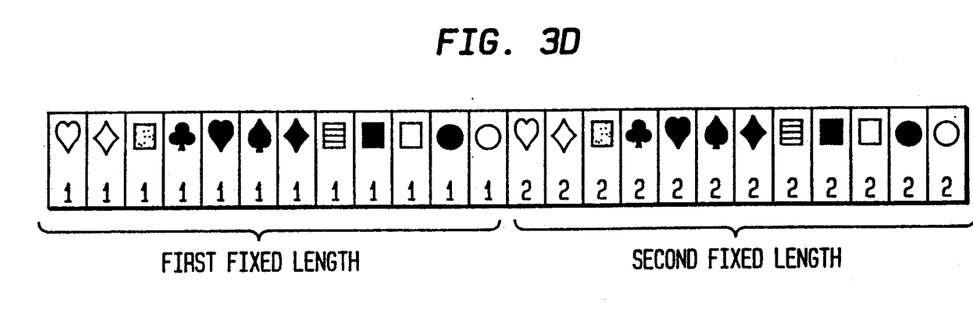

FIG. 2 is block diagram showing an overall structure of the image signal band compressing system in the D-VTR which executes compressing the image data according to the present invention. In the drawing, reference numeral 10 denotes a pre-filter, 20 a mode switching circuit portion, 30 a scrambler, 40 a discrete coding transform portion, 50 a human visual unit, 60 an activity calculator, 70 and 110 quantizers for quantizing the image data, 80 and 120 denote adaptive scanning portions, 90 and 130 variable length coders, 140 a comparator, 150 a factor removing and stuffing-bit appending portion.

Further, 200 denotes a local decoder for decoding the coded data, 300 a motion expectation circuit portion, 400 a motion compensator, 500 a mode selector, ECC an error correction coder. These circuits or portions are departed from the scope of the present invention and, therefore, the detailed content will be omitted for the convenience of the description.

The image signal band compressing method of the present invention employs a three-dimensional motion compensating technique, an intraframe and an interframe processes which are alternatively executed. The transfer rate of the intraframe to the interframe is set to 4:1 in a unit of fixed length. The intraframe process is defined such that the present frame image data is compressed in a variable length compressing manner by way of two-dimensional discrete coding transform. The interframe process is defined such that motion data is estimated by comparing the present frame and the preceding frame, the present frame is expected on the basis of the motion data and the difference data between the motion compensated image data and the present frame data.

Figure 1B:
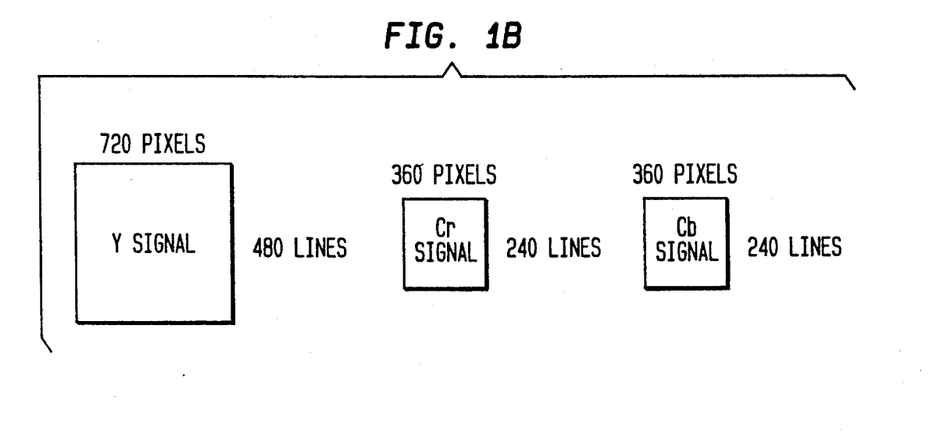
Figure 1C:
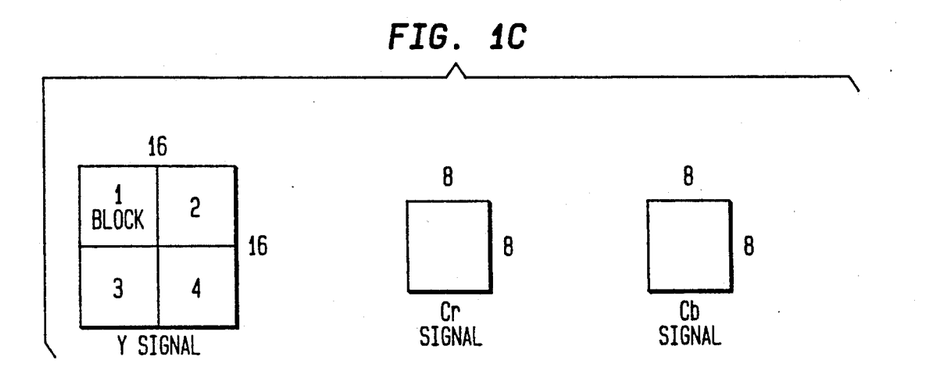

As seen from FIG. 1(b), in the case of the intraframe, the unit of the fixed length is set by twelve blocks (Y signal: 8 blocks, Cr signal: 2 blocks, Cb signal: 2 blocks) of the unit block of 8 pixels $\times$ 8 lines (i.e., 1 block), while as shown in FIG. 1(c) in the case of the interframe, the fixed length is set by four macro blocks (Y signal: 4 blocks (16 pixels $\times$ 16 lines), Cr signal: 1 block, Cb signal: 1 block).

Therefore, in case of the interframe the unit to be processed is altered within the fixed length in a unit of block or macro block in accordance with the mode (i.e., intra mode, inter mode).

Now, the description will be made with reference to the intra mode and inter mode.

1) Intra frame processing mode

The image signal input is reconstructed through the scrambling portion in a unit of block within a frame and subjected to two-dimensional DCT process which is executed in a unit of the block. The DCT factors of one block include a DC component and sixty-three AC components. The DC component is transferred in a form of 8 bit fixed length as it is. Alternatively, the AC components are entered to a first and second quantizers 70 and 110 and an activity calculator 60 through a HVS (human visual system) weighting factor considering the human visual character particularly sensitive to the lower frequency separately to the brightness signal Y and the color difference (c) signal. DCT factors of the AC components are quantized at a step size in the quantization $g=2\times Qp$ (Qp: 1~31). The quantization step size of the first quantizer 70 depends upon the average of the sum of absolute values of the DCT factors calculated by the activity calculator 60 in a unit of fixed length and the output value of the sum of the absolute value of the DCT factors in a block and is upgraded in a unit of block.

The DCT factors quantized by the first quantizer 70 are scanned by way of a scanning mode selected from the vertical scanning mode, the horizontal scanning mode and the zigzag scanning mode and then entered to the first variable length coder 90 which produces two-dimensional variable length code of continuous "0" (run) and quantization level and obtains the difference of the actually produced data (including the DC component) having additional data accumulated in a unit of fixed length from the target amount of data having a fixed length. The difference produced by the first variable length coder 90 is transferred to the comparator 140.

The second quantizer 110 decides the quantization step size (i.e., update in a unit of block) by using the quantization step deciding factors in the first quantization 70 and the difference between the actually produced amount of data and the target amount data of the first variable length coder 90 and quantizes the DCT factors. Then, the quantized factors are subjected to a variable length coding effected by a scanning method selected by the second adaptive scanner 120 and a second variable length coder 130 which are composed of the same logic as that of the first adaptive scanner 80 and the first variable length coder 90. Furthermore, a difference of the target amount of data and the actual amount of data having fixed length is obtained and entered to the comparator 140.

Accordingly, the comparator 140 compares the differences from the first and second variable length coders 90 and 130 and transfers the minimumly quantized value, the adaptive scanning method and the variable length coded value to the factor moving and stuffing-bit appending portion 150 which effects removing the factors and appending a stuffing bit when the actual amount of data overflows or underflows the target amount of data.

2) Interframe processing mode

Under this interframe processing mode, the present frame is compared with the locally decoded preceding frame to estimate the object moving variable. Then, the present frame is estimated by using the moving variable so as to effect a DCT conversion to the difference between the motion-compensated image data and the present frame and encode the DCT-converted factors, thereby compressing the image signal. The previously mentioned motion estimation and compensation are effected in a forward manner with a unit of macro block in a such a way of $16\times 16$ full search (1 per resolution) and achieved by way of the interframe or interframe mode in accordance with the amount of the motion.

Meanwhile, the scrambler 30 and the human visual unit 50 is retained in non-operate and only the scanning method of the zigzag is employed in the intraframe processing mode. The remaining processes are same with the intraframe processing mode in consideration of the hardware structure. In case of the interframe mode, the quantization step size is set in a unit of block while in the intraframe mode it is set in a unit of macro block.

FIG. 3 is a view illustrating the principle of scrambling process according to the present invention.

Substantially a fluctuating region of the image is distributed at the center of the image while the flattening region is distributed at edges of the picture image. Also, a human visual character sensitively responds to deterioration of the centre of the image.

Accordingly, the scrambling process is effected such that the fluctuating and flattening regions of the image are uniformly distributed and the surplus data of the flattening region are provided to the fluctuating region so as to condensate the picture quality deteriorated region at the edges of the picture image, thus reconstructing the image without using additional data.

This scrambling process is effected in a unit of block only during executing the intraframe mode.

As seen from FIG. 3, a unit of fixed length of the intraframe is defined by Y signal of 8 blocks, Cr signal of 2 blocks and Cb signal of 2 blocks.

Substantially, the length fixing process is applied from the center toward an edge of the picture image through the scrambling, so that the surplus data of the flattening region distributed at the edges of the picture image are provided to the fluctuating region condensated at the center of the picture image, achieving the uniformity of the picture quality in a unit of the fixed length and minimizing the deterioration of the picture quality.

Figure 4:
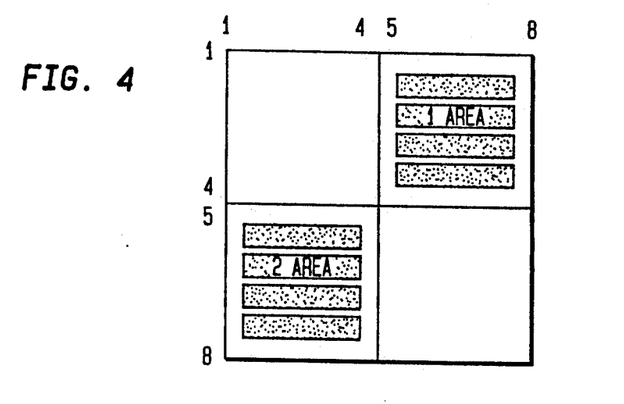
FIG. 4 is a view illustrating the principle of an adaptive scanning method according to the present invention.

Referring to FIG. 4, the adaptive scanning process effected by the adaptive scanning portions or scanners 80 and 120 according to the present invention is illustrated. The adaptive scanning method is defined such that the quantized data excluding zero '0' are sorted before the scanned data and the quantized data of zero "0" are arranged after the scanned data.

As seen from FIG. 4, the scanning pattern is decided in such a way that by comparing the activities of the absolute values of the DCT factors of the first and second areas of 4 pel $\times$ 4 line in a block of 8 pixels $\times$ 8 lines, the following conditions are established, that is, the first area activity $>$ the second area activity $>$ K: horizontal scanning the first area activity/the second area activity $<$ K2: vertical scanning K1 $<$ the first area activity/the second area activity $<$ K2: zigzag scanning According to the scanning pattern deciding method, only 4 pixels $\times$ 4 lines of a block is compared, so the hardware can be simplified in structure. The above-mentioned method is applied only to the intraframe.

Figure 5:
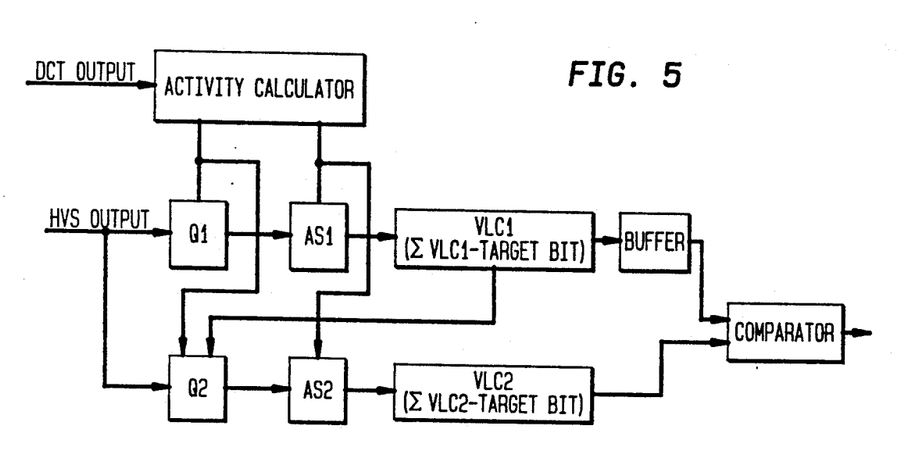
FIG. 5 is a view illustrating the quantization and variable length coding of data according to the present invention; and, FIG. 6 is a view illustrating a factor removing and stuffing-bit appending procedure according to the present invention.

FIG. 5 is a block diagram illustrating the principle of the double quantizers 70 and 110 and the variable length coders 90 and 130.

The quantization step size is decided by the activity and the activity average of the block (intra mode) or macro block (inter mode) in the unit of fixed length. Therefore, the picture quality can be uniformed in a unit of fixed length in consideration of the whole and local natures of the picture image. Also, the double quantization and variable length coding are effected for the image signal, so a drawback is that it is difficult to coincide the actually produced amount of data under the buffer pre-control and the target amount of data.

More specifically, the activity calculator 60 produces the sum (activity) of the absolute values of the DCT factors of a unit of a block as well as the average value of the activity in a unit of the fixed length and outputs the sum and average values to the first and second quantizers 70 and 110.

At this time, the quantization step size of the first quantizer 70 is set as follows.

$$qs1 = (\alpha \times activity)/activity\ average$$

where, $\alpha$ is a parameter determined by the accumulated and operated value of the activity of a unit of fixed length.

The value 'qs1' is updated in a unit of block in case of the intramode while it is updated in unit of a macro block in a case of the intermode.

The quantization step size of the second quantizer 110 can be obtained using the value 'qs1', the activity and activity average, the target data amount and '$\beta$' ($=\Sigma VLC1-$target data amount) which is obtained by executing the two-dimensional variable length coding on the basis of the continuous "0" (run) and the quantization level through the first quantizer 70 and the first adaptive scanner 80, accumulating and operating the coded output and estimating the difference between the accumulated and operated value and the target data amount. That is, $$qs2 = qs1 \times [(qs1 \times \beta \times activity)/(target\ data\ amount \times activity\ average)].$$

Further, the step size 'qs2' is also updated in a unit of block under the intramode and, alternatively, it is updated in a unit of macro block under the inter mode.

The DCT factors which are quantized by the quantization step size of 'qs2' are subjected to a two-dimensional variable length coding to obtain a value $\gamma(=\Sigma VLS2-$target data amount) in the substantially same logic as the value '$\beta$'.

The comparator 140 finally decides the quantization step size, the adaptive scanning pattern, the variable length code and then transfers the image data the factor removing and stuffing-bit appending portion 150. That is:

$$TH: \quad |\beta - \gamma| < 0 \text{ (output of } VLC1 \text{ selected)}$$
$$|\beta - \gamma| > 0 \text{ (output of } VLC2 \text{ selected)}$$

The factor removing and stuffing-bit appending portion 150 removes the factors when the overflow is occurred in the difference between the data amount of fixed length unit from the comparator 140 and the target data amount. The portion 150 appends the stuffing bit under the underflow generated from the difference.

Figure 6:
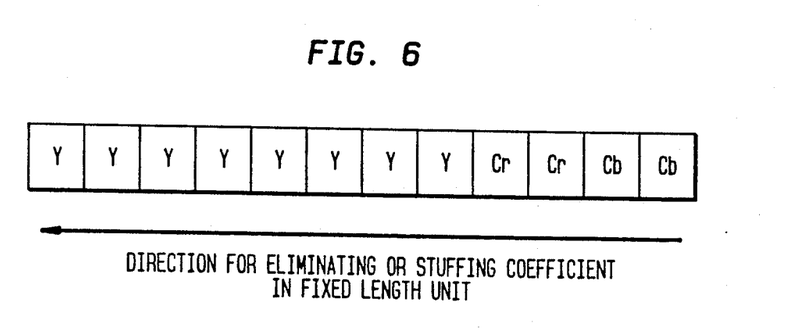

This factor removing and the stuffing-bit appending process is executed in a unit of block with use of the principle illustrated in FIG. 6.

More particularly, the factor removing and stuffing-bit appending process is executed in an inverse order of the blocks having fixed length along the order opposited to the scan sequence by one bit per a block (i.e., Cb→Cb→Cr→Cr→Y→Y→Y→Y→Y→Y→Y→Y→Cb . . . ) until the actually produced data is coincided with target data in amount.

As mentioned above, the present invention can provide the following effects. That is, firstly, since the intraframe and interframe process are alternatively executed the coding efficiency can be improved sufficiently.

Secondly, the fluctuating region and flattening region of the image signal can be reconstructed in unit of fixed length by the scrambling process without employing additional information, in such a way that the surplus data of the flattening region are provided to the fluctuating region and the region deteriorated in quality at the edge of the image. As a result, the uniformity in the picture quality can be assured and the deteriorated in quality of the image can be minimized.

Thirdly, since a large number of continuous '0' can be generated by way of the adaptive scanning, the coding efficiency can be improved considerably. Fourthly, by the application of double quantizer, the variable length coder and comparator, the drawback occurred from the coincidence of the actually produced data with the target data in the quantization and buffer pre-control can be also solved effectively. Finally, the factor removing and stuffing-bit appending process is effected in an inversed block order of the fixed length (i.e., the inverse order of signal importance) by one bit per a block. As a result, the quality of the picture image can be uniformed in a unit of fixed length.

Although the present invention has been described with the specified examples, it will be understood that changes and modifications will be made therein without departing from the spirit and scope of the invention.

What is claimed is:

1. An image signal band compressing system comprising:
    a mode switching means for processing image data in a unit of block or macro block, the image data being produced from component image signals converted in a ratio of 4:2:0, and the component image signals having a brightness signal Y and color signals Cr and Cb set in a ratio of 4:2:2 in correspondence to an intraframe mode or an interframe mode;
    a scrambling means for supplying surplus data of a fluctuating region of the image input and resorting the image input without using additional data, the picture quality-deteriorated portion of the image input being condensated at edges of the image;
    a discrete coding transform means for transforming and coding the output of the scrambling means by using discrete coding transform factors;
    a human visual unit for processing the output of the discrete coding transform means in correspondence to the sensitivity of the human visual system;
    an activity calculating means for calculating an activity and an activity average of the output of the human visual unit in the intraframe process mode or interframe process mode;

a first quantization means for quantizing the output of the human visual unit in a unit of block or macro block, the quantized output having a step size determined by the activity and activity average corresponding to the intraframe or interframe processing mode;

a first adaptive scanning means for comparing the activities between two regions in four scanning areas of 4 pixels×4 lines in a block of 8 pixels×8 lines and executing any one of a horizontal scanning, a vertical scanning and a zigzag scanning;

a first variable length coding means for effecting a variable length coding of the output of the first adaptive scanning means and calculating a difference Beta between the amount of data produced by accumulating the variable length coded data in a unit of fixed length and a target amount of data;

a buffer for temporarily storing the output of the first variable length coding means;

a second quantization means for quantizing the output of the human visual unit in a unit of block or macro block at a step size decided on the basis of the difference $\beta$ from the first variable length coding means and the activity and activity average from the activity calculating means.

a second adaptive scanning means for comparing the activities between two regions of four scanning areas in the output of the second quantization means and effecting any one of horizontal scanning, vertical scanning and a zigzag scanning;

a second variable length coding means for executing a variable length coding to the output of the second adaptive scanning means and calculating a difference between the amount of data produced by the variable length coding process and a target amount of data;

a comparator for selecting the output of the first variable length coding means when an absolute value $|\beta-\gamma|$ is equal to or less than the absolute value being obtained by subtracting the difference of the second variable length cosign means from the difference of the first variable length coding means and, contrarily, selecting the output of the second variable length coding means when the absolute value is not zero; and, a factor removing and stuffing-bit appending means for removing factors of data exceeding the fixed length when an overflow is generated on the basis of the difference from the comparator and, contrarily, appending a stuffing bit when an underflow is generated.

* * * * *